United States Patent
Konrad et al.

[15] 3,636,887
[45] Jan. 25, 1972

[54] LOAD-DIVIDING GATE SUSPENSION WITH SAFETY MECHANISM

[72] Inventors: Marion G. Konrad, Hacienda Heights; John W. Erickson, Huntington Beach; Frank Burnett, Costa Mesa, all of Calif.

[73] Assignee: Preco, Inc., Los Angeles, Calif.

[22] Filed: Aug. 6, 1970

[21] Appl. No.: 61,604

[52] U.S. Cl. ............................................. 105/376
[51] Int. Cl. ........................................ B61d 45/00, B60p 7/14
[58] Field of Search ........................... 105/376, 369 B

[56] References Cited

UNITED STATES PATENTS

| | | |
|---|---|---|
| 3,208,403 | 9/1965 | Magarian et al. ................... 105/376 |
| 3,361,086 | 1/1968 | Kessler ................................ 105/376 |
| 3,369,502 | 2/1968 | Breen et al. ........................ 105/376 |
| 3,549,291 | 12/1970 | Pettigrew et al. .................. 105/376 |

Primary Examiner—Drayton E. Hoffman
Attorney—Charlton M. Lewis

[57] ABSTRACT

The present safety mechanism comprises a member journaled at each end of the squaring shaft of a gate suspension mechanism, extending generally horizontally below the supporting rail and then extending upward in spaced relation outward of the supporting rail. Such a member retains the defining sprocket in supported relation to the rail despite failure of sprocket teeth. The member is preferably journaled directly on the sprocketed roller and coupled by a flexible linkage to the gate structure. The gate structure is then supported despite failure of the shaft.

2 Claims, 3 Drawing Figures

PATENTED JAN 25 1972
3,636,887
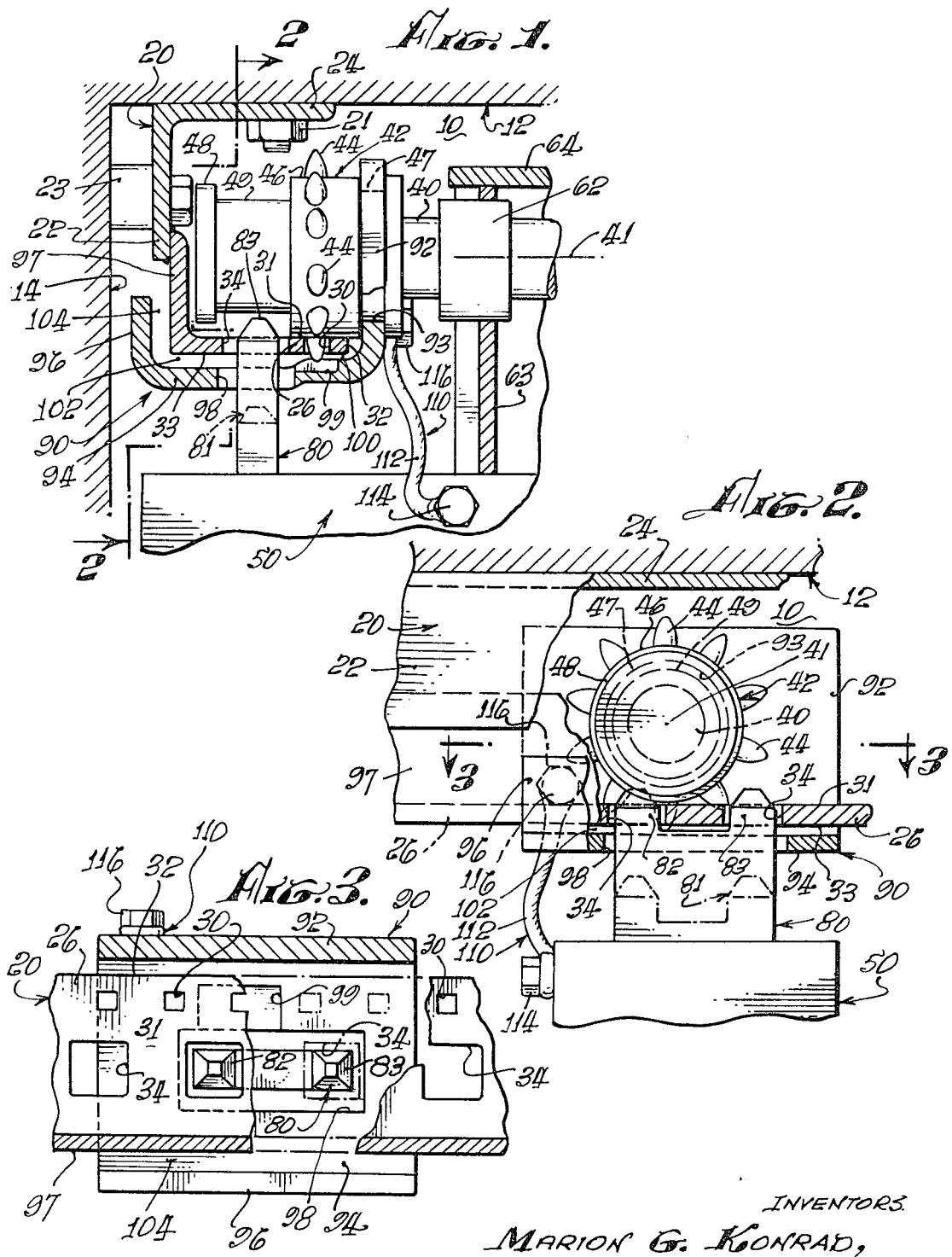
INVENTORS.
MARION G. KONRAD,
JOHN W. ERICKSON,
FRANK BURNETT,
By Charlton M. Lewis

LOAD-DIVIDING GATE SUSPENSION WITH SAFETY MECHANISM

This invention has to do with suspension mechanisms for loading dividing gates such as are commonly used in the lading compartment of a vehicle. The invention relates more particularly to improved safety mechanism for supporting such gates reliably despite failure of certain parts of the mechanism.

It is common practice to suspend a load-dividing gate from two laterally spaced, fixedly mounted rails on which it is longitudinally movable by means of a supporting shaft having at its ends sprocketed rollers that ride the rails. The sprocket teeth engage racklike formations on the rails and maintain the shaft perpendicular to the rails as it is rolled along them. Manually controlled locking pins are provided on the gate for releasably locking the gate in a selected position in the compartment. Various means have been proposed for retaining the sprocket teeth in engagement with the racklike rail formations, including, in particular, a member journaled on the sprocket wheel and extending in spaced relation below the rail flange, as described and claimed in U.S. Pat. No. 3,358,617, issued on Dec. 19, 1967, to John W. Erickson, one of the present applicants. It has been found, however, that failure of one or more sprocket teeth may still permit the shaft to become oblique with respect to the rails, and even to fall free of them, endangering personnel and cargo.

A primary purpose of the present invention is to provide economical and effective mechanism for preventing such accidental release of the gate.

A further purpose of the invention is to prevent accidental release of the gate in case of failure of the supporting shaft.

A particular advantage of the invention is that the useful retaining functions are accomplished without requiring any special rail configurations, which tend to add appreciable weight and expense.

In accordance with the present invention, a retaining member is journaled with respect to the shaft axis and extends down and then outwardly parallel to the lower face of the rail with an upwardly directed lip which extends upward in spaced relation outwardly of the rail web. Such an extended retaining member, when mounted in defined angular relation to the shaft axis, positively couples the roller to the rail independently of the sprocket teeth. That coupling action is normally potential rather than actual, since the sprocket teeth are ordinarily fully effective to hold the roller in supported relation on the rail. However, in case of failure of the sprocket teeth the described coupling action of the retaining member becomes effective to prevent the roller from leaving the rail.

That safety coupling action may also be utilized for holding the roller on the rail in case of failure of the supporting shaft. For that purpose the retaining member is journaled directly on the roller, and a flexible cable or similar coupling is connected between the retaining member and the gate structure. The cable is normally slack but is effective to support the gate in case of shaft failure. Such a flexible cable can also be employed in connection with other structures for positively retaining the sprocket wheel in supported relation to the rail, as described and claimed in the copending patent application Ser. No. 721,511, filed on Apr. 15, 1968, now U.S. Pat. No. 3,549,291, by Paul Pettigrew and two of the present applicants and assigned to the same assignee as the present application.

The structure of the present invention is useful in connection with load-dividing gates which are directly suspended from the described supporting shaft, and also for gates which are mounted on that shaft by means of mechanism permitting the gate to swing about a vertical axis and to move in translation along the length of the shaft. The term "gate structure" is intended to include such supporting mechanism, if present.

A full understanding of the invention, and of its further objects and advantages, will be had from the following description of certain illustrative manners in which it may be carried out. The particulars of that description, and of the drawings which form a part of it, are intended only as illustration and not as a limitation upon the scope of the invention.

In the drawings:

FIG. 1 is a fragmentary transverse section of a vehicle lading compartment with a suspension mechanism embodying the invention;

FIG. 2 is a section generally on line 2—2 of FIG. 1; and

FIG. 3 is a section on line 3—3 of FIG. 2.

In the drawings the gate supporting rail 20 is mounted on the lading compartment ceiling 12 by the bolts 21, and extends longitudinally of the compartment 10 closely spaced from the sidewall 14. A similar rail is mounted adjacent the opposite sidewall of the compartment, or adjacent the midplane of the compartment, depending upon whether the gate to be suspended is a full or half gate. Each rail 20 comprises a generally vertical supporting web 22 with the upper mounting flange 24 and the lower load-supporting flange 26, which extend inwardly and generally horizontally from web 22. Lower flange 26 has the upper load-carrying surface 31, the free inner edge 32 and the lower surface 33. The latter surface terminates outwardly in the outwardly facing rail surface 97. Flange 26 has the racklike apertures 30 near its free inner edge 32 and has the relatively large locking apertures 34 positioned near web 22. Rail 20 may also be supported on sidewall 14, preferably with spacing blocks 23 to set the rail out from the wall. If the rail is mounted entirely from the sidewall, upper rail flange 24 may sometimes be omitted.

The gate supporting shaft 40, with the axis 41, is supported at its ends on the respective rails by rollers which are rotatably fixed on the shaft. As shown for roller 42, each roller carries the sprocket teeth 44 for engaging rail apertures 30. Roller 42 has a cylindrical surface 46 which rolls freely on upper surface 31 of rail flange 26 adjacent its inner edge 32. The roller also has a cylindrical surface 48 which is normally closely spaced from rail flange 26 adjacent web 22 and shares the gate load with surface 46 under conditions of shock stress, thus reducing the possibility of deforming the rail flange. The roller is deeply relieved at 49 between surfaces 46 and 48 to provide clearance for the gate locking pins, to be described.

In the present illustrative embodiment the load-dividing gate 50 is suspended from shaft 40 by the two bracket members 63, which are rigidly mounted on the gate near its respective vertical edges, only one such member being shown explicitly. The bracket members are strengthened by the shroud 64 and carry the bearings 62 in which the shaft is journaled. Alternatively, brackets 63 and shroud 64 may be considered to form part of a beam on which shaft 40 is journaled and from which the gate proper is suspended in known manner by means of a carriage which runs on tracks longitudinally of the beam and on which the gate is pivotally mounted. In the present description and claims the term "gate structure" is intended to include such a beam and carriage mechanism, if used.

The gate locking pin 80 is mounted in the gate in conventional manner for vertical sliding movement between the gate locking position in which it engages the rail apertures 34, as shown in solid lines in FIGS. 1 and 2, and the gate releasing position, shown in dot-dash lines at 81. A similar locking pin is provided for engaging the other supporting rail, and conventional locking pins and fixedly mounted locking strips are provided for releasably securing the lower edge of the gate. Pin 80 is typically provided with dual prongs 82 and 83 (FIG. 2) which project into two adjacent locking apertures 34 of the rail for locking the gate.

In accordance with the present invention the retaining member 90 is journaled with respect to shaft axis 41 in definite angular relation to that axis. Member 90 is preferably journaled directly on the roller, as by the peripheral channel 47. Member 90 comprises the vertical supporting portion 92, containing the circular opening 93 by which the member is journaled on roller 42, the generally horizontal lower portion 94, which extends in spaced relation below rail flange 26, and the generally vertical retaining portion 96, which extends upward as a lip from the outer edge of lower portion 94 in spaced relation to the outwardly facing surface 97 of rail web 22. Member 90, and particularly its lower portion 94, is shaped to extend far enough longitudinally of rail 20 so that swinging of the member about its mounting on roller 42 cannot cause frictional locking with the lower face 33 of the rail. Member 90 may be constructed, if desired, by assembling a number of elements, as by welding, in mutually fixed relation, but is shown illustratively as a unitary structure. An aperture 98 is provided in lower portion 94 of the retaining member to provide clearance for locking pin 80. It is preferred that the gate releasing position of the locking pin be low enough to clear member 90, as indicated at 81, and if the gate suspension includes pivotal movement of the gate about a vertical axis such clearance is necessary. Retainer member 90 is preferably recessed at 99 to insure clearance for sprocket teeth 44.

The retaining member is preferably so dimensioned as to provide relatively close spacing between its lower portion 94 and the edge portion of rail flange 26, as indicated at 100, thus normally retaining the sprocket teeth essentially fully engaged in rail apertures 30. The remainder of lower portion 94 is preferably offset to provide increased spacing from the rail flange, as indicated at 102, to avoid any possibility of binding between that portion of the retainer and the rail. Vertical retaining portion 96 may be relatively widely spaced from rail web 22, as indicated at 104. If one or both of the rollers is mounted in splined relation on shaft 40, as may be done to accommodate slight variations in spacing between the two rails 20, the spline structure should include positive stop mechanism to prevent the roller from leaving the shaft, in the general manner described in the above-identified patent application.

Retaining portion 96 of member 90 positively maintains roller 42 in supported relation on rail 20 independently of the normal defining function of sprocket teeth 44. Thus, if one or more of the sprocket teeth should fail for any reason, allowing shaft 40 to slide along the rail and become oblique, such obliqueness is checked as soon as lip 96 engages the outer rail face 97. Hence the gate is reliably supported by the rail despite sprocket tooth failure. Similar action occurs at the other end of shaft 40.

In accordance with a further aspect of the invention, the flexible coupling 110 is connected between the gate structure and retainer member 90. Coupling 110 typically comprises a steel cable 112, formed with eyes at its ends and connected at one end by the bolt 114 to the gate, or to the gate supporting beam, if used, and connected at the other end to retainer member 90 by the bolt 116. To insure full effectiveness of coupling 110, retainer 90 should be journaled directly on roller 40, as typically shown in the drawings. Presence of coupling 110 in combination with the described retainer structure then insures continued support of the gate structure from rail 20 even if support shaft 40 should fail. Since the assembly of retainer member and roller is positively retained on the rail by retainer lip 96, even failure of support shaft 40 cannot release the gate from the rail.

On the other hand, the previously described action of maintaining gate support despite failure of the sprocket teeth does not require journaling of retainer 90 directly on the roller, though that is preferred. For that purpose it is sufficient that the retainer be journaled with respect to the shaft by any structure that maintains a definite angular relation between the retainer and the shaft axis.

We claim:

1. In combination with suspension mechanism for a load-dividing gate structure for a vehicle lading compartment, which suspension mechanism includes two parallel laterally spaced rails fixedly mounted in the compartment and comprising generally horizontal, inwardly extending flange portions having upper load supporting surfaces, free inner flange edges and lower rail surfaces that terminate outwardly at generally vertical, outwardly facing rail surfaces, a shaft extending between the rails with roller structures including sprocket teeth mounted in fixed rotational relation on the respective shaft end portions, the roller structures riding the rail flange portions and the sprocket teeth engaging racklike formations on the rail to maintain the shaft in uniform angular relation to the rails, and mechanism suspending the gate structure from the shaft; retaining structure comprising a member journaled with respect to the shaft in definite angular relation to the shaft axis, the member including a first retaining portion extending generally horizontally in spaced relation below the rail flange portion and normally positively retaining the sprocket teeth in engagement with the racklike formations, and said member including also a second retaining portion extending generally vertically in spaced relation outward of said outwardly facing rail surface and positively retaining the roller structure in supported relation to the rail independently of failure of the sprocket teeth.

2. Retaining structure as defined in claim 1, and in which said member is journaled directly on said one roller structure, and said retaining structure includes an elongated flexible coupling connected between said member and the gate structure, said coupling being normally untensioned and acting to support the gate structure independently of shaft failure.

* * * * *